United States Patent [19]

Stahl et al.

[11] Patent Number: 4,503,725
[45] Date of Patent: Mar. 12, 1985

[54] BRACING DEVICE FOR MACHINE TOOLS

[75] Inventors: Bernhard Stahl, Neunkirchen; Horst Böhm, Siegen, both of Fed. Rep. of Germany

[73] Assignee: Firma Optima-Spanntechnik GmbH, Siegen, Fed. Rep. of Germany

[21] Appl. No.: 409,185

[22] Filed: Aug. 18, 1982

[30] Foreign Application Priority Data

Feb. 15, 1982 [DE] Fed. Rep. of Germany ....... 8204128

[51] Int. Cl.³ .......................... F16H 1/16; F16H 1/20; B25B 1/10; B25B 5/10
[52] U.S. Cl. .......................... 74/424.8 B; 74/424.8 R; 74/89.15; 74/109; 269/241
[58] Field of Search .......................... 269/241, 60, 61; 74/109, 424.8 B, 424.8 R, 89.15, 841

[56] References Cited

U.S. PATENT DOCUMENTS

| 260,366 | 7/1882 | Burr | 74/424.8 B |
|---|---|---|---|
| 314,087 | 3/1885 | Wakeley | 269/241 |
| 931,833 | 8/1909 | Adams | 269/241 |
| 1,172,480 | 2/1916 | Napier et al. | 74/424.8 R |
| 2,783,809 | 3/1957 | Haines | 74/424.8 B |
| 2,842,982 | 7/1958 | Holdener | 74/424.8 R |
| 2,869,861 | 1/1959 | Carlson | 74/109 |
| 2,874,877 | 2/1959 | Spencer | 74/424.8 R |
| 3,178,958 | 4/1965 | Beck | 74/424.8 R |
| 3,338,140 | 8/1967 | Sheesley | 74/109 |
| 3,668,940 | 6/1972 | Auena et al. | 74/89.15 |
| 3,763,747 | 10/1973 | Beichel et al. | 74/424.8 R |
| 3,803,926 | 4/1974 | Winter | 74/89.15 |
| 4,220,188 | 9/1980 | McMurray | 411/185 |
| 4,234,177 | 11/1980 | McDougal | 269/241 |

FOREIGN PATENT DOCUMENTS 2707247 8/1978 Fed. Rep. of Germany ...... 474/110

Primary Examiner—Lawrence J. Staab
Assistant Examiner—Michael David Bednarek
Attorney, Agent, or Firm—Toren, McGeady and Stanger

[57] ABSTRACT

A bracing device for machine tools which is formed with a compensation unit having a housing with threaded pins arranged in the housing rotatably displaceable relative thereto with a hydraulic rotary drive being provided for actuating the threaded pins.

9 Claims, 2 Drawing Figures

BRACING DEVICE FOR MACHINE TOOLS

The present invention relates generally to machine tool devices and more particularly to a device for bracing tools and/or workpieces.

In machine tools such as presses, bracing members in particular serve generally to automatically brace or support tools on the press bed, press ram, or work blank holder. The press bracing members are generally hydraulically actuated, and the actual bracing force which is applied is frequently produced by means of a mechanical toggle system. This generally allows operation of the device with very small stroke lengths while permitting a deployment of a large force. As a result, in known press bracing members, exact thickness tolerances must be observed within a range of ±2 mm and ±0.5 mm.

However, in presses which operate in a stepped or graduated manner and which have wedge adjustment devices, such small tolerances need not be observed since the course or path of the wedge adjustment must be included and in such devices a toggle joint support head cannot be employed.

Accordingly, the invention is directed toward providing a device for bracing tools and/or workpieces, with the device being simply constructed and permitting speedy and secure actuation while allowing relatively large bracing distances to be spanned. Moreover, the invention is directed toward providing a device which is capable of absorbing large forces so that when the bracing forces are not sufficient, it can be used in combination with a toggle joint support head or the like.

SUMMARY OF THE INVENTION

Briefly, the present invention may be described as a bracing device for workpieces in machine tools comprising a compensation unit having a housing and threaded pin means arranged in the housing rotatably displaceable relative thereto, with hydraulic rotary drive means being provided for actuating the pin means.

In accordance with the invention, the hydraulic rotary drive acts on the threaded pin means so that the pin means will be screwed into or out of the housing. In this manner, large bracing distances may be spanned and the housing and the threaded pin means may nevertheless be stable enough that the device may absorb and also develop very large forces in accordance with the dimensioning of the rotary drive means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
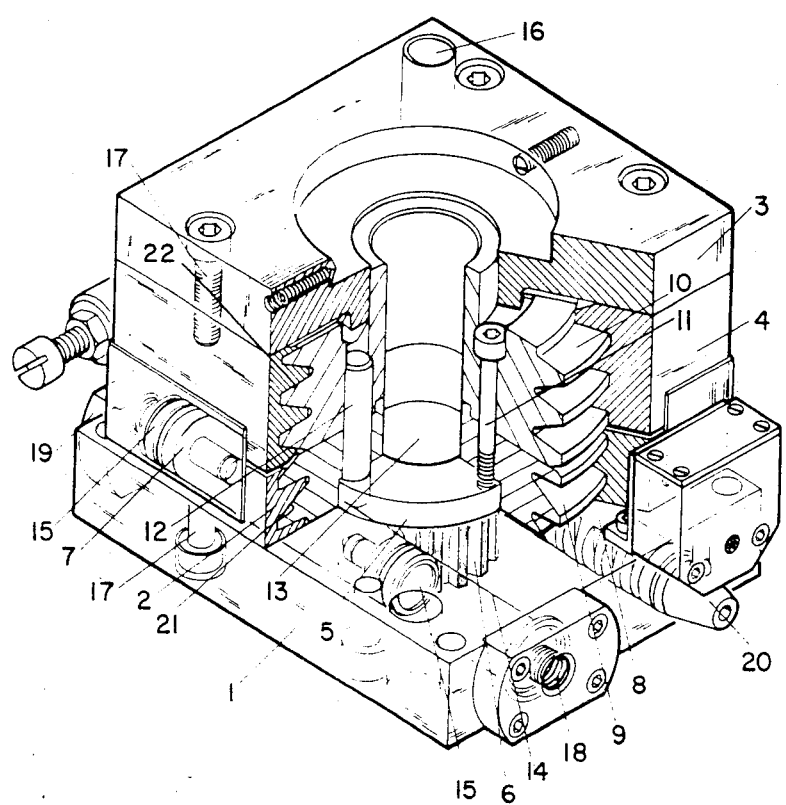
FIG. 1 is a perspective view partially broken away and partially in section depicting a device in accordance with the invention.

Referring now to the drawings, and more particularly to FIG. 1, the device in accordance with the present invention is depicted as composed of a housing including a rectangular housing bottom 1 and a lower threaded part 2 connected with the housing bottom 1. Arranged above these parts is an upper threaded part 4 which is firmly connected with a housing top 3. A pinion 5 provided with outer teeth 6 is rotatably supported in the housing bottom 1 and the pinion 5 is engaged by a toothed rack 7 and by an additional toothed rack 8 arranged in parallel with the rack 7.

The device includes threaded pin means which comprise a lower threaded pin member 9 and an upper threaded pin member 10.

The pinion 5 and the lower threaded pin member 9 as well as the upper threaded pin member 10 are connected with each other so as to be relatively nonrotatable and nondisplaceable by means of a pair of dowel pins 12 and three cylinder head studs or screws 11.

A bore 13 extends through the pinion 5, through the lower threaded pin member 9, and through the upper threaded pin member 10. The lower threaded pin member 9 is provided with threads 21 which are right-hand threads and which operate together with a corresponding female thread in the lower threaded part 2. The upper threaded pin member 10 is provided with threads 22 which are left-hand threads and which operate together with corresponding female threads on the upper threaded part 4. The threads are formed as sawtooth or flat threads having a lead in the lower threaded pin member 9 which is only as large as that in the upper threaded pin member 10.

During rotation of the pinion 5, the lower threaded pin member 9 will move relative to the lower threaded part 2 only half the distance as compared with the upper threaded part 4 with the housing top 3 in relation to the upper threaded pin member 10.

The toothed rack 7 is arranged in a housing bore 14 and is provided on each end thereof with hydraulic pistons 15 which are guided in sealed engagement in the housing bore 14. Each side of the toothed rack 7 is subjected to hydraulic fluid by means of a hydraulic fluid connection 18 or 19, respectively, in order to displace the toothed rack 7 in one or the other direction to terminal positions and in order to effect a screwing out or screwing in of the threaded pin members 9 and 10 into the threaded parts 2 and 4.

An additional toothed rack 8 is arranged parallel to the toothed rack 7, and the toothed rack 8 operates together with a switching device 20 which is dependent upon the positioning or path of the rack 8 and which is formed as an adjustable limit switch which may operate to control an indicator showing the end position or for pressure control for the admission of pressure to the hydraulic pistons 15.

During rotation of the threaded pin members 9 and 10 and the consequent axial displacement of the housing parts 1, 3 with the threaded parts 2, 4, these parts will be guided axially against one another by means of guide bolts 16 and will be secured against rotation. The housing bottom 1 is firmly connected with the lower threaded part 2, and the housing top 3 is firmly connected with the upper threaded part 4 by means of screws 17.

The device in accordance with the invention may be directly employed for bracing tools and/or workpieces on tool machines if the necessary bracing forces are not too large. However, as a rule, the device is employed as a compensation unit in connection with a bracing head.

Figure 2:
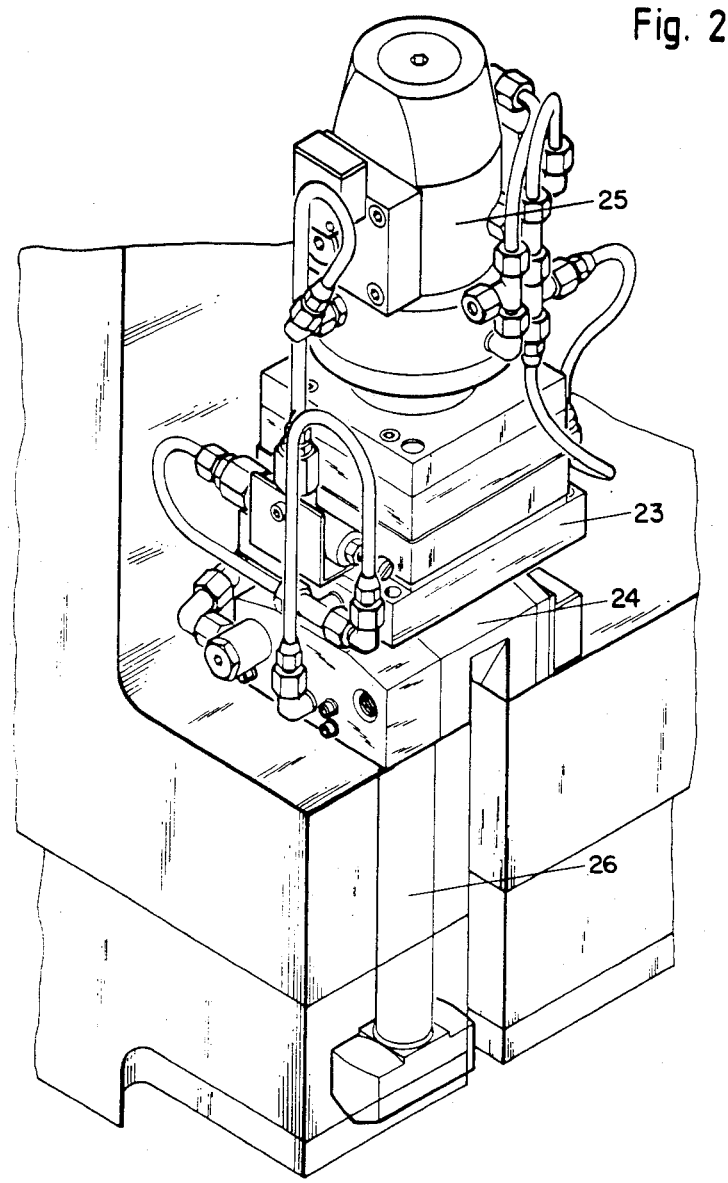
FIG. 2 is a perspective view showing a device in accordance with the invention in combination with a bracing head and a swiveling unit for actuation of a tie rod.

In FIG. 2 there is shown a swiveled bracing device wherein a compensation unit 23, structured in accordance with the present invention, is provided together with a swiveling unit 24 and a bracing head 25 which are arranged axially one over the other. A tie rod 26 is attached to the bracing head 25 and, by means of the swiveling device, the tie rod may rotate through a maximum angle of 180° to release a tool from a ram plate or table plate. Subsequently, large tool thicknesses having tolerances of up to 15 mm may be first continuously compensated by means of the compensation unit 23 and this is quite significant, for example, in step-wise operating presses with wedge adjustments. The compensating unit 23 may bridge the path of the wedge adjustment and subsequently permit employment of a bracing head 25 in order to obtain extremely high bracing forces by means of a toggle effect wherein the bracing force remains constant in each case and is not dependent upon the tool thickness tolerance. Full control and supervision of the complete unit and adjusted bracing forces is also maintained.

Thus, in accordance with the present invention, in order to relieve the hydraulic rotary drive after bracing, it is advantageous to provide the threaded pin means with self-locking thread means 21, 22 on the threaded pins 9 and 10 and on the housing 2 and 4. Moreover, in order to enlarge the stroke of the compensation unit, the threaded pin means may have two threaded areas having opposite leads which work together with corresponding housing parts secured against one another against rotation. Since each of the threaded areas in the pertaining housing part screws in and out in an opposite manner, a much larger stroke results at the same rotation angle whereby the possibilities of use of the compensation unit are further improved.

It is advantageous to provide both threaded areas with threads of different leads so that the one housing part executes a larger stroke than the other housing part at the same angle of rotation whereby the desired stroke permits adaptation of the attainable rotation angle. In order also to maintain the smallest possible spring forces generated in the unit and directed on the housing parts when the greatest forces are acting on the threads, it is preferred to form the threads as sawtooth or flat threads wherein the flatter tooth profile absorbs axial forces. A sawtooth thread with two threads is also suitable.

In a particularly simple manner, the rotary drive is composed of the toothed rack 7 arranged in the housing, which toothed rack engages in the outer toothing on the threaded pin and whose ends are formed as hydraulic pistons. In accordance with the direction of rotation, hydraulic liquid is introduced to one of the hydraulic pistons and the toothed rack moves thereby causing rotation of the threaded pin means. In order to employ the device in accordance with the invention as a press bracing member, the threaded pin means is provided with an axial bore through which a tie rod may be connected with a bracing head.

The operating path or distance of the device may be controlled in a simple manner by means of the second toothed rack 8 which likewise engages the outer toothing and acts upon a switch device, such as the switch device 20, which is dependent upon the path of travel.

The toothed rack may be connected with an electrical position sensor or it can act on a limit switch which, in the respective limits of the path of travel, will interrupt the admission of pressure of the hydraulic piston on the toothed rack.

Thus, in accordance with the present invention, the self-locking threads 21, 22 are provided on the threaded pins 9 and 10 and on the corresponding threads in the housing 2 and 4. The two thread areas 21 and 22 are formed with opposing leads on the threaded pin 9 and 10 and on the housing parts 2 and 4, working together and secured against one another against rotation. The two thread areas 21 and 22 are formed with different leads and, as indicated, a sawtooth or flat thread 21, 22 may be provided.

The outer toothing 6 on the threaded pin means 9, 10, engages the toothed rack 7, and the hydraulic pistons act on the rack 7.

With the second toothed rack 8, which also engages with the outer toothing 6, there is provided the switch device which senses the path of travel and therefore enables automatic operation of the device.

While a specific embodiment of the invention has been shown and described in detail to illustrate the application of the inventive principles, it will be understood that the invention may be embodied otherwise without departing from such principles.

What is claimed is:

1. A bracing device for machine tools comprising:
    a housing bottom member having a first housing part firmly connected thereto, said first housing part having internal threads therein;
    a first threaded bolt member having threads formed therein engaging with said first housing part;
    a second housing part having internal threads therein;
    a housing top member firmly connected with said second housing part;
    a second threaded bolt member having threads formed therein engaging with said second housing part;
    said threads in said second bolt member having a different lead than said threads in said first bolt member;
    a pinion member rotatably supported in said housing bottom member which interacts with said first and said second threaded bolt members;
    hydraulic rotary drive means including a drive rack engaging with said pinion member and a hydraulic drive mechanism acting on both sides of said pinion to effect actuation thereof; and
    an axial bore extending through said housing bottom member and said housing top member as well as through said pinion member;
    said axial bore having a tie rod which is connected to a bracing head member extending therethrough.

2. A device according to claim 1, wherein said threads in said first threaded bolt member are right-hand threads and wherein said threads in said second threaded bolt member are left-hand threads.

3. A device according to claim 1, wherein said first and second housing parts are driven to move axially by engagement with said first and second threaded bolt members, respectively, as a result of rotary driving engagement between said pinion member and said first and second threaded bolt members, with axial movement of said second housing part being twice that of said first housing part.

4. A device according to claim 1, further comprising control rack means operatively engaging said pinion member for enabling operative control of said bracing device.

5. A device according to claim 1, wherein said internal threads in said first and second housing parts and said threads in said first and second threaded bolt members comprise sawtooth threads.

6. A device according to claim 1, wherein said internal threads in said first and second housing parts and said threads in said first and second threaded bolt members comprise flat threads.

7. A device according to claim 6, further comprising a switching device responsive to operation of said control rack means for controlling operation of said device.

8. A device according to claim 1, wherein said first and second threaded bolt members and said pinion member are rotatively affixed with each other.

9. A device according to claim 1, wherein said internal threads of said first and second housing parts and said threads of said first and second threaded bolt members comprise self-locking threads.

* * * * *